(12) United States Patent
Aaron et al.

(10) Patent No.: US 8,924,295 B2
(45) Date of Patent: Dec. 30, 2014

(54) USER TERMINAL LOCATION BASED CREDIT CARD AUTHORIZATION SERVERS, SYSTEMS, METHODS AND COMPUTER PROGRAM PRODUCTS

(75) Inventors: Jeffrey A. Aaron, Atlanta, GA (US); John P. Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2176 days.

(21) Appl. No.: 11/619,234

(22) Filed: Jan. 3, 2007

(65) Prior Publication Data
US 2008/0162346 A1   Jul. 3, 2008

(51) Int. Cl.
*G06Q 40/00* (2012.01)

(52) U.S. Cl.
USPC .......................................................... 705/44

(58) Field of Classification Search
CPC ............................... G06Q 20/40; G06Q 20/10
USPC ..................................................... 705/35–45
See application file for complete search history.

(56) References Cited

U.S. PATENT DOCUMENTS

| | | | |
|---|---|---|---|
| 6,612,488 B2 | 9/2003 | Suzuki | |
| 6,913,194 B2 | 7/2005 | Suzuki | |
| 7,104,444 B2 | 9/2006 | Suzuki | |
| 2004/0203923 A1 * | 10/2004 | Mullen | 455/456.1 |
| 2004/0254868 A1 * | 12/2004 | Kirkland et al. | 705/35 |
| 2007/0084913 A1 * | 4/2007 | Weston | 235/380 |

FOREIGN PATENT DOCUMENTS

WO    WO 2004079499 A2 *   9/2004

* cited by examiner

*Primary Examiner* — Robert Niquette
*Assistant Examiner* — Chia Yi Liu
(74) *Attorney, Agent, or Firm* — Parks IP Law LLC; Mickki D. Murray, Esq.

(57) ABSTRACT

Credit card transaction servers, systems, methods and computer program products receive information concerning a prospective credit card transaction with one of multiple credit card issuers and obtain location information from multiple wireless network providers for wireless terminal(s) that are associated with a user of the credit card for the prospective credit card transaction. The locations of the credit card transaction terminal(s) and the locations of the wireless terminal(s) are correlated, and authorization information for the prospective credit card transaction is generated based upon this location correlation.

20 Claims, 7 Drawing Sheets

USER TERMINAL LOCATION BASED CREDIT CARD AUTHORIZATION SERVERS, SYSTEMS, METHODS AND COMPUTER PROGRAM PRODUCTS

FIELD OF THE INVENTION

This invention relates to computer servers, systems, methods and computer program products, and, more particularly, to credit card transaction authorization servers, systems, methods and computer program products.

BACKGROUND OF THE INVENTION

Credit cards are widely used for many consumer, commercial and other transactions. As used herein, the term "credit card" includes debit cards and other stored value cards in various form factors, such as wallet-sized, keychain-sized, etc.

Unfortunately, with the proliferation of credit cards, credit card fraud has become all too common. A thief can steal a credit card, and then use it to purchase thousands of dollars of goods and services before the card is denied. Many measures have been provided to reduce the possibility of fraud, including card holder signatures on the credit card, a picture identification on the credit card and/or the requirement for a separate picture identification of a credit card user, security codes printed on the credit card, billing address verification, purchase pattern screening and/or other known techniques.

A credit card authorization system is described in U.S. Pat. Nos. 6,612,488, 6,913,194 and 7,104,444, all to Suzuki, and all entitled Method and System to Prevent Fraudulent Payment In Credit/Debit Card Transactions, and Terminals Therefor. As noted in the common Abstract of these three patents, during a transaction authorization process using a transaction terminal disposed in a credit transaction member store and connected with a host computer, user validation or credit administration is carried out by using a portable communication terminal to input to the host computer identity information which has been previously registered in the portable communication terminal and/or location information for the portable communication terminal.

Notwithstanding these and other measures, credit card fraud continues to be a problem. It is, therefore, desirable to provide additional measures that can reduce or prevent credit card fraud. Moreover, the additional security that is provided should be balanced with the convenience to the legitimate credit card user.

SUMMARY OF THE INVENTION

Credit card transaction servers according to some embodiments of the present invention include a credit card transaction interface, a wireless network interface and a credit card transaction authorization processor. The credit card transaction interface is configured to receive information about credit card transactions that are associated with multiple credit card issuers. The wireless network interface is configured to obtain location information for multiple wireless terminals that are associated with multiple wireless network providers. The credit card transaction authorization processor is responsive to receipt of information concerning a prospective credit card transaction with one of the multiple credit card issuers from the credit card transaction interface. The credit card transaction authorization processor is configured to instruct the wireless network interface to obtain location information from the multiple wireless network providers, for at least one wireless terminal that is associated with a user of the credit card for the prospective credit card transaction, and to correlate the location of a credit card transaction terminal that is associated with the prospective credit card transaction and the location(s) of the wireless terminal(s). The credit card transaction authorization processor is also configured to generate authorization information for the prospective credit card transaction based on the locations of the credit card transaction terminal and the wireless terminal(s) that were correlated.

As used herein, location information also includes proximity information. Thus, in some embodiments the credit card transaction authorization processor may be responsive to receipt of information concerning a prospective credit card transaction with one of the plurality of credit card issuers from the credit card transaction interface, to instruct the wireless network interface to obtain proximity information from the plurality of wireless network providers for at least one wireless terminal that is associated with a user of the credit card for the prospective credit card transaction, to correlate the proximity of a credit card transaction terminal that is associated with the prospective credit card transaction to the at least one wireless terminal and to generate authorization information for the prospective credit card transaction based on the proximity of the credit card transaction terminal and the at least one wireless terminal. Proximity may be obtained by communications between the wireless terminal(s) and the credit card transaction terminal over an ad hoc short-range wireless network, wherein the geographic locations of the wireless terminal(s) and the credit card transaction terminal need not be separately known, as long as their proximity to one another can be determined.

In some embodiments, the credit card transaction authorization processor is configured to selectively authorize the prospective credit card transaction if the wireless network interface determines that only a single wireless terminal is associated with the user of the credit card for the prospective credit card transaction, and the credit card transaction terminal is sufficiently close to the single wireless terminal. Authentication may be selectively obtained of the user prior to authorizing the prospective credit card transaction if the credit card transaction terminal is not sufficiently close to the single wireless terminal.

Moreover, in other embodiments, the credit card transaction authorization processor is configured to selectively authorize the prospective credit card transaction if the wireless network interface determines that multiple wireless terminals are associated with the user of the credit card for the prospective credit card transaction, and the credit card transaction terminal is sufficiently close to all of the multiple wireless terminals. Authentication of the user may be selectively obtained prior to authorizing the prospective credit card transaction if the credit card transaction terminal is not sufficiently close to all of the multiple wireless terminals. Moreover, the credit card authorization processor may also be configured to selectively obtain additional authentication of the user prior to authorizing the prospective credit card transaction if the credit card transaction terminal is not sufficiently close to all of the multiple wireless terminals and at least two of the wireless terminals are associated with different wireless network providers.

In other embodiments of the invention, the credit card transaction authorization processor is configured to determine the location of the credit card transaction terminal that is associated with the prospective credit card transaction by identifying a merchant that is associated with the credit card transaction terminal and obtaining at least one location of the merchant from a geographic information system. In some embodiments, a plurality of locations of the merchant may be obtained and the credit card transaction authorization processor may be configured to correlate the plurality of locations of the merchant and the location of the at least one wireless terminal, and to generate authorization information for the prospective credit card transaction based on the plurality of locations of the merchant and the at least one wireless terminal that were correlated.

In still other embodiments, the credit card transaction authorization processor is further configured to correlate the location of the credit card transaction terminal that is associated with the prospective credit card transaction, the location of the at least one wireless terminal that is associated with the credit card user, and a history of past credit card transactions for the credit card that took place prior to the prospective credit card transaction. Authorization information may be generated for the prospective credit card transaction based on the locations of the credit card transaction terminal and the at least one wireless terminal, and the history that were correlated.

In some embodiments of the invention, the authorization information for the prospective credit card transaction may be generated by transmitting a message to the at least one wireless terminal that is associated with the user of the credit card of the prospective credit card transaction. In other embodiments, a message may be transmitted to the credit card transaction terminal that is associated with the prospective credit card transaction. In still other embodiments, a message may be transmitted to a merchant terminal that is associated with the credit card transaction terminal. For example, the merchant terminal may be a wireless terminal of a clerk who is operating the credit card transaction terminal. Moreover, in some embodiments, the authorization information may be generated by obtaining a picture of the user of the credit card from the credit card issuer and/or from the wireless network provider, and transmitting the picture of the user of the credit card. In some embodiments, a date stamp for the picture may also be obtained and the picture may be selectively transmitted if the date stamp is sufficiently old.

It will be understood by those having skill in the art that embodiments of the invention have been described above in connection with credit card transaction servers. However, analogous systems, methods and computer program products also may be provided according to other embodiments of the present invention.

Credit card transaction authorization methods according to some embodiments of the present invention may selectively obtain first, second and third levels of user authentication for a prospective credit card transaction. In some embodiments, a first level of user authentication for a prospective credit card transaction is selectively obtained if all wireless terminals that are registered to a user of the credit card for the prospective credit card transaction are sufficiently close to a credit card transaction terminal for the prospective credit card transaction. Moreover, a second level of user authentication, that is greater than the first level, may be obtained for the prospective credit card transaction if at least one of the wireless terminals that are registered to the user is not sufficiently close to the credit card transaction terminal. Finally, a third level of user authentication, that is greater than the second level, may be selectively obtained if the multiple wireless terminals are associated with multiple wireless network providers, and at least one of the multiple wireless terminals is not sufficiently close to the credit card transaction terminal. In some embodiments, the second or third level of user authentication may include transmitting a picture of the user that was obtained sufficiently before the prospective credit card transaction and verifying an identity of the user from the picture that was transmitted.

Credit card transaction authorization methods according to still other embodiments of the present invention may obtain a picture of a user of a credit card transaction terminal for a prospective credit card transaction from a wireless network provider that is associated with the user and/or from a credit card issuer that is associated with the prospective credit card transaction, along with a date stamp for the picture. The picture may be selectively transmitted to a location near the credit card transaction terminal, to allow an identity of the user to be verified, if the date stamp is sufficiently before the prospective credit card transaction.

It will be understood that various method embodiments of the invention have been described above. However, analogous server, system and computer program embodiments also may be provided according to other embodiments of the invention. Moreover, the various embodiments of the invention that are described herein may be combined in various combinations and subcombinations.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Figure 1:
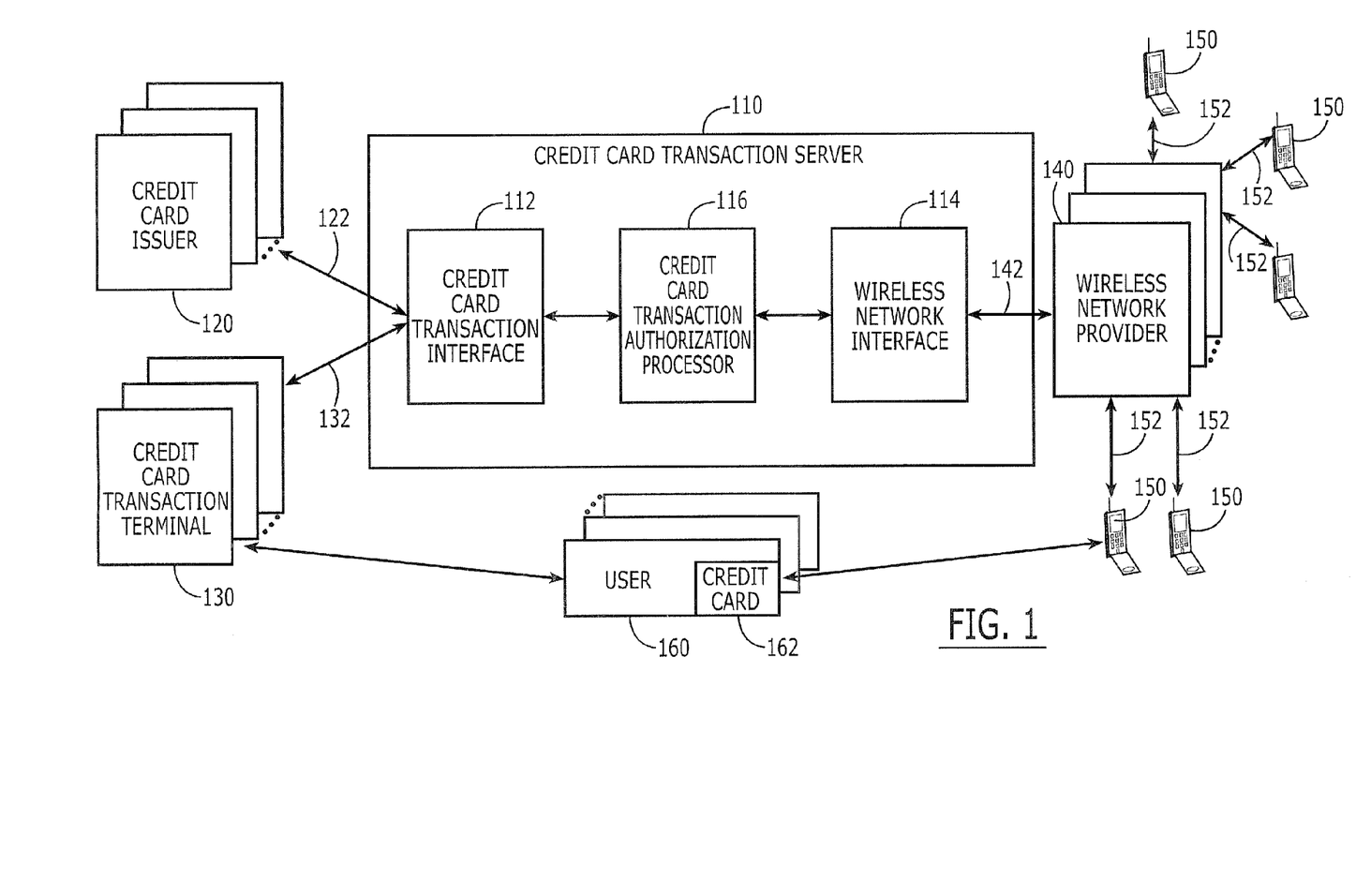
FIG. 1 is a block diagram of user terminal location based credit card authorization servers, systems, methods and/or computer program products according to various embodiments of the present invention.

FIG. 1 is a block diagram of credit card transaction servers, systems, methods and/or computer program products according to various embodiments of the present invention. Referring now to FIG. 1, a credit card transaction server 110 includes a credit card transaction interface 112, a wireless network interface 114 and a credit card authorization processor 116. The credit card transaction server 110 may be embodied as one or more enterprise, application, personal, pervasive and/or embedded computer systems that are connected via a wireless and/or wired, private and/or public network, including the Internet.

The credit card transaction interface 112 is configured to receive information about credit card transactions that are associated with a plurality of credit card issuers 120. The information about credit card transactions may be obtained directly from the plurality of credit card issuers 120 and/or from credit card transaction terminals 130 that are associated with various merchants and which service one or more credit card issuers. The information about the credit card transactions may be received from the credit card issuers 120 over private and/or public wired and/or wireless communications links 122, and the information about credit card transactions may be received from the credit card transaction terminals 130 over private and/or public wired and/or wireless communications links 132. By receiving information about credit card transactions that are associated with a plurality of credit card issuers, the credit card transaction server 110 can provide an authorization clearinghouse for credit card transactions for multiple credit card issuers 120 and merchants 130, to thereby allow reduced credit card fraud. However, in other embodiments, the server 110 may service a single credit card issuer 120 and/or merchant.

Still continuing with the description of FIG. 1, a wireless network interface 114 is configured to obtain location information for a plurality of wireless terminals 150 that are associated with a plurality of wireless network providers 140. The location information may be obtained in response to a specific inquiry related to a prospective credit card transaction and/or may be obtained periodically by the wireless network interface 114 polling the wireless network providers 140 and/or by the wireless network providers 140 periodically providing the location information to the wireless network interface 114. As described in more detail below, the location information may include proximity information. The wireless network providers 140 may communicate with the wireless network interface 114 over one or more private and/or public wired and/or wireless communications links 142. The wireless terminals 150 may communicate with the wireless network providers 140 over one or more wireless links 152 using conventional wireless protocols. As used herein, the term "wireless terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver. By providing an interface to multiple wireless network providers 140, location information concerning multiple wireless terminals that are registered to a given user may be obtained, which can be used to reduce credit card fraud as will be described below. However, in other embodiments, the server 110 may serve a single wireless network provider 140.

Still referring to FIG. 1, a credit card transaction authorization processor 116 communicates with the credit card transaction interface 112 and the wireless network interface 114. In some embodiments, the credit card transaction authorization processor 116 is responsive to receipt of information concerning a prospective credit card transaction with one of the plurality of credit card issuers 120 (directly or via a credit card transaction terminal 130) from the credit card transaction interface 112, to instruct the wireless network interface 114 to obtain location information from the plurality of wireless network providers 140 for at least one wireless terminal 150 that is associated with a user 160 of the credit card 162 for the prospective credit card transaction. The wireless network interface 114 can obtain the location information by polling the wireless network providers 140 and/or by searching pre-stored location information, for instance recently received location information falling within a given or maximum time window for location validity. The credit card transaction authorization processor 116 is also configured to correlate a location of the credit card transaction terminal 130 that is associated with the prospective credit card transaction and the location(s) of the at least one wireless terminal 150, and to generate authorization information for the prospective credit card transaction based on the locations of the credit card transaction terminal and the at least one wireless terminal that were correlated. Many specific embodiments will be described in detail below.

Many techniques may be used to determine a location of a credit card transaction terminal 130. In some embodiments, the credit card transaction terminal may be equipped with a Global Positioning System (GPS) and/or other location based system that can provide its latitude and longitude (and/or other) coordinates. In other embodiments, the credit card transaction terminal 130 may supply a merchant identification, such as a merchant name and/or a merchant identification number, and this merchant name and/or identification number may be applied to a geographic information system to obtain the merchant location. Geographical information systems such as Google® Maps or MapQuest® are well known to those having skill in the art and need not be described further herein. Similarly, many techniques may be used by the wireless network providers 140 to determine a location of a wireless terminal 150. For example, the wireless terminal 150 may include a GPS or other location based system therein. Alternatively, triangulation techniques based on the wireless network cells to which a given wireless terminal 150 is communicating may be used.

Alternatively or additionally, short-range sensing/distance measuring techniques may be used to determine proximity between the wireless terminal 150 and the credit card transaction terminal 130, without the need to determine their actual geographic locations. For example, the credit card transaction terminal 130 can use Bluetooth, Wi-Fi and/or other short-range ad hoc wireless links to query the wireless terminal 150. The wireless terminal may then reply with an identification, and the time involved may determine the distance between them. In another example, the ability to set up an ad hoc short-range wireless link, such as Bluetooth, between the wireless terminal 150 and the credit card transaction terminal 130, may itself provide an indication that the wireless terminal 150 and the credit card transaction terminal are sufficiently close to one another. This determination may be provided to the credit card transaction authorization processor 116 by the credit card transaction terminal 130 via the credit card transaction interface 112 and/or by the wireless network provider 140 via the wireless network interface 114.

Accordingly, embodiments of the present invention that are described herein with respect to locations of at least one wireless terminal that is associated with a user of a credit card for a prospective credit card transaction and a location of a credit card transaction terminal that is associated with the prospective credit card transaction, contemplate the use of proximity information between the at least one wireless terminal that is associated with a user of the credit card for the prospective credit card transaction and a credit card transaction terminal that is associated with the prospective credit card transaction. In some embodiments, there may be no need to separately determine the geographic locations of the at least one wireless terminal and the credit card transaction terminal if proximity therebetween can be determined separately. Other techniques also may be used.

A credit card transaction server 110 according to some embodiments of the present invention can service credit card transactions from multiple merchants (i.e., multiple transaction terminals 130) and multiple credit card issuers 120, and can correlate the location of a credit card transaction terminal 130 with the location of one or more wireless terminals 150 that are registered to a user 160 of a credit card 162 for the prospective credit card transaction. A location based credit card transaction authorization clearinghouse thereby may be provided that can process requests from multiple credit card issuers 120 and multiple merchants 130, and can obtain location information from multiple wireless network providers 140. Moreover, added levels of fraud prevention may be provided by obtaining location information for multiple wireless terminals of a given wireless network provider 140 or multiple wireless network providers 140 that are registered to a given user. Accordingly, increased levels of fraud prevention may be provided.

Figure 2:
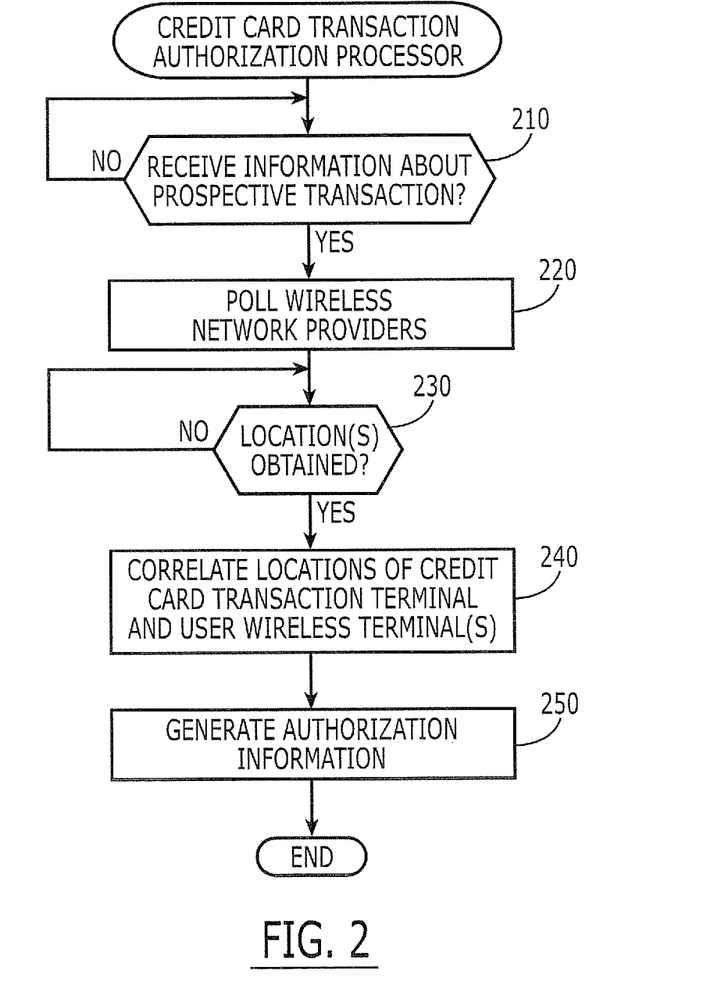
FIG. 2 is a flowchart of operations that may be performed for credit card transaction authorization according to various embodiments of the present invention.

FIG. 2 is a flowchart of operations that may be performed by a credit card authorization processor, such as the credit card transaction authorization processor 116 of FIG. 1, according to some embodiments of the present invention. Referring now to FIG. 2, at Block 210, information is received about a prospective credit card transaction. This information may be received by the credit card transaction interface 112 of FIG. 1 via the credit card issuer 120 and/or the credit card transaction terminal 130 that is associated with the prospective credit card transaction. The information that is received can include a transaction amount, a credit card number, a merchant identification number and/or other conventional information concerning the transaction.

Referring now to Block 220, in response to receiving the information about the prospective transaction, the wireless network providers 140 may be polled to provide location information for at least one wireless terminal 150 that is associated with a user 160 of the credit card 162 for the prospective credit card transaction. The polling may take place via communication between the wireless network interface 114 and the wireless network provider 140 over links 142. It will also be understood by those having skill in the art that, in other embodiments, polling need not take place, but, rather, information concerning locations of wireless terminals 150 may be provided periodically by the wireless network providers 140 to the wireless network interface 114, and prestored.

It will also be understood that the wireless network providers 140 may be provided with a name and/or other identifying information of a user 160 that corresponds to the credit card 162 being used for the prospective credit card transaction, and the wireless network providers 140 may use that name and/or other information to identify locations of all wireless terminals 150 that are associated with that name and/or other information. Other conventional electronic commerce techniques may be used to identify the user 160. It also will be understood that embodiments of the invention can allow multiple wireless network providers 140 to be polled or otherwise to provide location information. By allowing multiple wireless network providers 140 to provide location information, enhanced security may be provided. For example, when multiple wireless terminals 150 are registered to a given user 160, the location of all of the wireless terminals 150 may be correlated with the location of the credit card transaction terminal 130 for the prospective credit card transaction. Moreover, especially when wireless terminals 150 for a given user 160 are provided by multiple wireless network providers 140, enhanced security authorization may be obtained to reduce the likelihood that a wireless terminal was registered with another network provider in the user's name by a thief in order to foil or spoof the location based authorization. Such registration with an additional wireless provider, when recent, may be particularly suspicious.

Continuing with the description of FIG. 2, at Block 230, when an identification of locations from all of the wireless network providers 140 has been obtained and/or when all of the wireless network provider customer databases have been searched for location information, then at Block 240 the credit card transaction authorization processor 116 correlates the location of the credit card transaction terminal 130 that is associated with a prospective credit card transaction, and the location(s) of at least one wireless terminal 150 that is associated with a user 160 of the credit card 162 for the prospective credit card transaction. Many different embodiments of correlating the locations will be described in detail below. Finally, at Block 250, authorization information for the prospective credit card transaction is generated based on the locations of the credit card transaction terminal 130 and the at least one wireless terminal 150 that were correlated. Many different embodiments of generating authorization information will be described below.

Figure 3A:
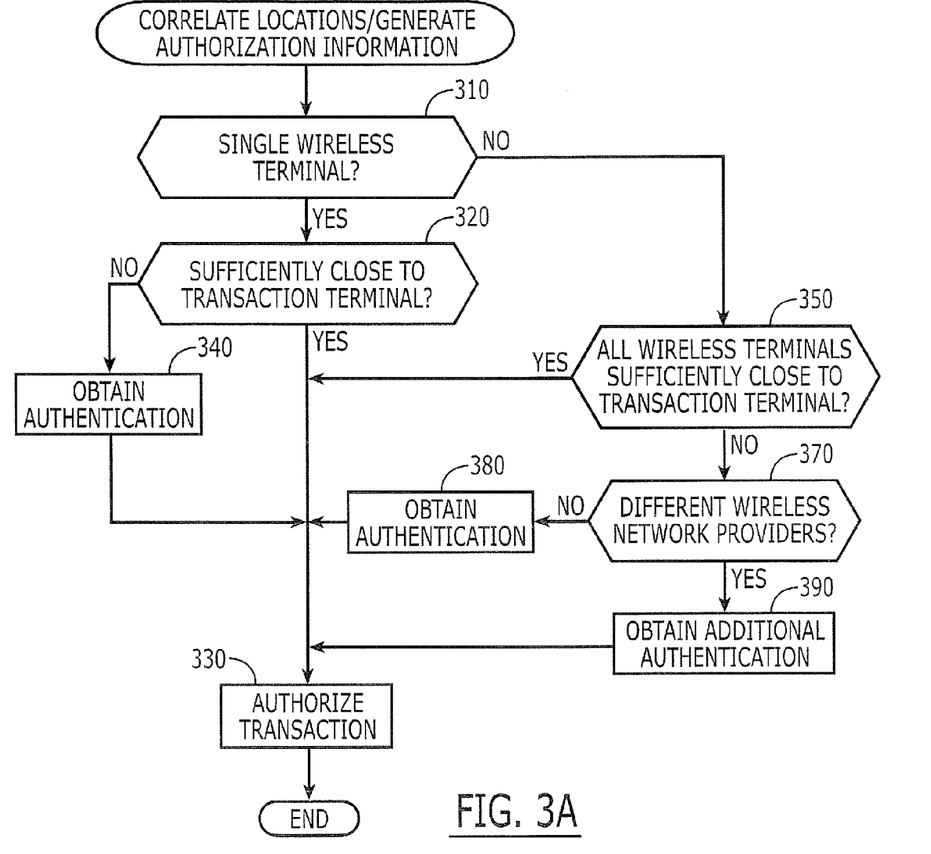
FIG. 3A is a flowchart of operations that may be performed to correlate locations and/or generate authorization information according to various embodiments of the present invention.

FIG. 3A is a flowchart of operations that may be performed to correlate locations of a credit card transaction terminal that is associated with a prospective credit card transaction and the location of at least one wireless terminal 150 that is associated with a user 160 of the credit card 162 of the prospective credit card transaction, and generating authorization information for the prospective credit card transaction based on the locations that were correlated, according to various embodiments of the present invention, which may correspond to Blocks 240 and/or 250 of FIG. 2. Moreover, FIG. 3B is a schematic diagram illustrating various location scenarios for FIG. 3A.

Figure 3B:
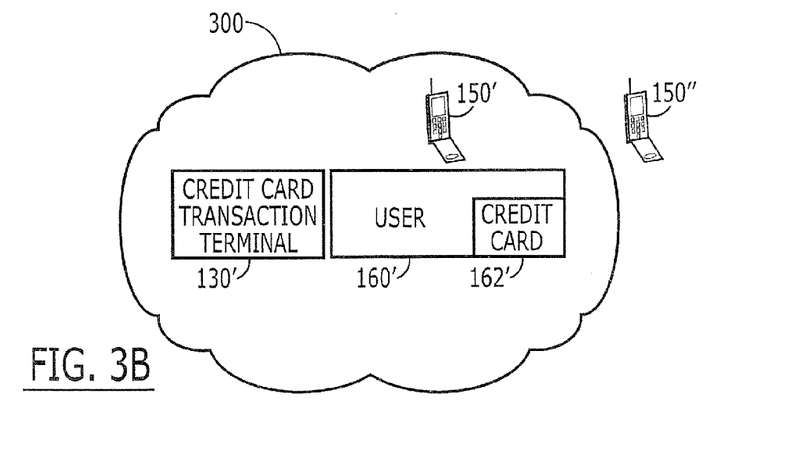
FIG. 3B is a schematic diagram of locations of various elements of a credit card transaction according to various embodiments of the present invention.

In particular, referring to FIGS. 3A and 3B, a determination is made at Block 310 as to whether only a single wireless terminal 150' is associated with the user 160' of the credit card 162' for the prospective credit card transaction at a given credit card transaction terminal 130'. This determination may be made by polling the plurality of wireless network providers 140 of FIG. 1 and/or by querying databases that relate to the plurality of wireless network providers 140. As shown at Block 320, if a single wireless terminal is present at Block 310, then a determination is made as to whether a single wireless terminal 150' is near the given credit card transaction terminal 130'. Stated differently, a determination may be made that the credit card transaction terminal 130' that is being used by the user 160' of the credit card 162' for the prospective credit card transaction is sufficiently close to the single wireless terminal 150', for example within a given distance 300. If so, then at Block 330 the transaction is authorized because the presence of a single wireless terminal 150' associated with the user 160' being in sufficiently close proximity to the credit card transaction terminal 130' provides a high likelihood that the transaction is legitimate.

On the other hand, if the single wireless terminal is not sufficiently close to the transaction terminal at Block 320, authentication of the user 160' may be required prior to authorizing the prospective credit card transaction. For example, the single wireless terminal may correspond to the wireless terminal 150" of FIG. 3B, which is outside the distance 300 of FIG. 3B. If so, at Block 340, independent authentication may be obtained from the user 160' by, for example, asking the user 160' to show a picture identification or to provide and/or participate in some other independent authentication prior to approving the transaction. It will be understood that the user 160' may be authorized even though the single wireless terminal 150' is not proximate to the user 160' because the user's spouse or child may be using the single wireless terminal 150' at the time of the prospective credit card transaction, or the user 160' may have accidentally left the single wireless terminal 150' at another location, such as at home. Nonetheless, due to the heightened possibility of fraud, additional authentication may be obtained at Block 340.

Returning again to Block 310, if the wireless network interface 114 determines that multiple wireless terminals, such as wireless terminals 150' and 150", are associated with the user 160' of the credit card 162' for the prospective credit card transaction at the credit card transaction terminal 130', then a test is made at Block 350 as to whether all of the multiple wireless terminals that are associated with the user 160' are sufficiently close to the credit card transaction terminal 130', for example located within the distance 300. If this is the case, then the transaction may be authorized at Block 330. Thus, in some embodiments of the invention, a given user 160' may carry two cell phones, a cell phone and a personal digital assistant, a cell phone and a pager, etc. If they are all close to the transaction terminal 130', it is highly likely that they are all being carried by the user 160' and additional authentication may not be needed.

Returning again to Block 350, if all of the wireless terminals 150', 150" are not located near the transaction terminal 130', a test is made at Block 370 as to whether different wireless network providers 140 provide the different wireless terminals 150', 150". For example, an inquiry may be made as to whether the first wireless terminal 150' and the second wireless terminal 150" are provided by different wireless network providers 140. If this is the case, then at Block 390, additional authentication may be required of the user, whereas, at Block 380, if the same network provider 140 provides the different terminals 150', 150", a lower level of authentication may be obtained from the user at Block 380.

Embodiments of Blocks 370, 380 and 390 may arise from recognition that a thief may attempt to spoof location based credit card authorization by registering an additional wireless terminal in the user's name, so that the additional wireless terminal is proximate the fraudulently obtained credit when a thief attempts to use the fraudulently obtained credit card. However, in these circumstances, it may be difficult for the thief to obtain a new terminal from the same wireless network provider as the legitimate user's wireless terminal. For instance, for reasons of marketing/security/billing, the same wireless provider may question and/or investigate multiple registration attempts and/or even contact the legitimate user. Thus, the thief may try to obtain a second wireless terminal from a different wireless network provider. Accordingly, a heightened level of authentication may be required at Block 390 when different wireless network providers provide the multiple wireless terminals 150', 150", compared to when all of the wireless terminals were obtained from the same wireless network provider. It will also be understood that there may be circumstances where the different wireless network terminals may have been obtained from different wireless network providers by a legitimate user. For example, a user may have a home cell phone from one wireless network provider and a business cell phone from another wireless network provider. Nonetheless, to reduce the likelihood of fraud, additional authentication may be obtained at Block 390 when different wireless network providers are present at Block 370.

Embodiments of FIGS. 3A and 3B have referred to one or more wireless terminals 150', 150" that are associated with a user 160' of a credit card 162' for the prospective credit card transaction being "sufficiently close" or "near" the credit card transaction terminal 130'. The definition of "sufficiently close" or "near" may always be the same or may vary depending upon the application. For example, it may required that the wireless terminal 150' is within 10 feet, or a minimum resolution distance of the location determining system, of the credit card transaction terminal 130', to ensure that the wireless terminal 150' is actually carried on the person of the user 160'. However, this distance 300 may be relaxed by a given credit card issuer and/or merchant. For example, in retail stores where a checkout line is used, the user 160' of the credit card 162' is generally very close to the credit card transaction terminal 130'. However, in a department store or other store that does not use checkout lines, the credit card transaction terminal 130' may be located a considerable distance away from the user, so that the distance 300 therebetween may be set to be larger, for example, up to about 30 feet. In other retail environments, the user 160 may actually browse the store while the transaction is being authorized, so that even greater distances 300 may be permitted. In still other embodiments, the acceptable distance 300 may be based on the type of wireless terminal 150'. For example, a laptop computer may be kept in a briefcase, and may be allowed a wider latitude than a cell phone or pager which is typically carried by the user. Moreover, the distance 300 may vary based on the time of day, the occurrence of certain sales or promotions, the history of use, types/models of wireless terminal, types/models of merchant terminal, ambient wireless interference conditions, error conditions and/or thresholds, the number of wireless devices registered to the user and/or other criteria, or may be fixed.

Moreover, the authentication levels that are described in Blocks 340, 380 and 390 may vary based on the identity of the merchant, the amount of the credit card purchase, the history of the user or the merchant and/or other known parameters. The authentication level obtained in Blocks 340 and 380 may be same or may be different. The additional authentication that is obtained in Block 390 is a higher level of authentication than Block 380. Various levels of authentication for credit card transactions are well known to those having skill in the art and may include providing an independent picture identification, providing one or more password/pass code/PIN (Personal Identification Number), providing secret information or answers to questions known only to the user over a phone line or other communication medium, an extended conversation with the representative of the credit card issuer and/or the merchant, and many other levels of authentication well known to those having skill in the art. Additional discussion of authentication levels will be provided below.

Figure 4:
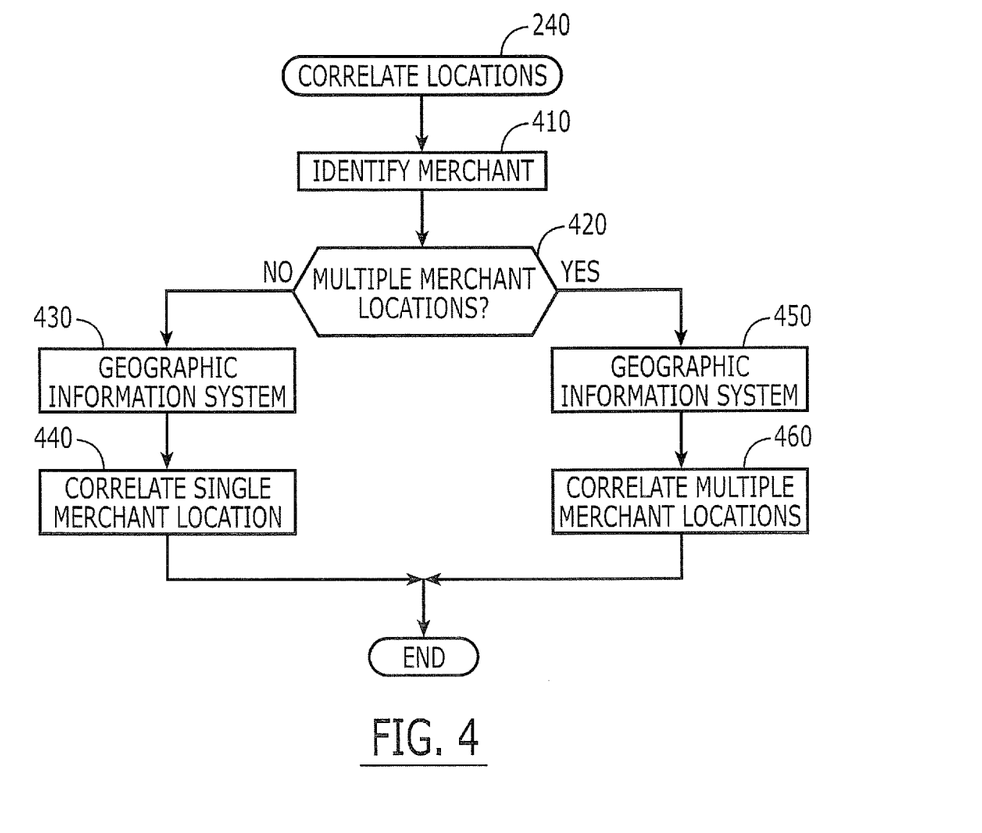
FIGS. 4-8 are flowcharts of operations that may be performed during credit card transactions according to various embodiments of the present invention.

FIG. 4 is a flowchart of operations that may be performed to correlate the locations of the credit card transaction terminal 130 that is associated with the prospective credit card transaction and one or more user wireless terminals 150 that are associated with the user 160 of the credit card 162, according to various embodiments of the present invention, which may correspond to Block 240 of FIG. 2. In particular, referring to FIG. 4, the location of the credit card transaction terminal 130 that is being used for the prospective credit card transaction may be provided by the credit card transaction terminal 130 itself, using pre-stored longitude and latitude coordinates. Alternatively, a credit card issuer 120 and/or a merchant may provide these coordinates along with a request for authorization of the prospective credit card transaction. In other embodiments, as illustrated at Block 410, the credit card transaction terminal 130 may only provide an identification of the merchant. For example, there may a large number of credit card transaction terminals at a "big box" retailer or other large merchant, and the individual location of the credit card terminal may be less important than the fact that it is located at the given big box retailer. Accordingly, an identification of the merchant may be provided.

Then, at Block 420, a determination is made as to whether multiple merchant locations are present within a given geographic area, such as a city. Thus, a determination may be made as to whether multiple sites of the big box retailer are present in a given city. If not, then a geographic information system, such as Google® Maps or MapQuest® may be queried with the merchant name, to obtain the merchant location at Block 430. This single merchant location can then be correlated with the location of the wireless terminal(s) 150 at Block 440, as was already described.

Alternatively, if multiple merchant locations are present within a given geographic region, the geographic information system may be queried at Block 450 and multiple locations may be obtained, as shown by multiple arrows 452. The multiple merchant locations may be correlated with the locations of the wireless terminal(s) 150, to determine, for example, whether one of the big box retailer locations corresponds to the location of the wireless terminal(s) 150.

Figure 5:
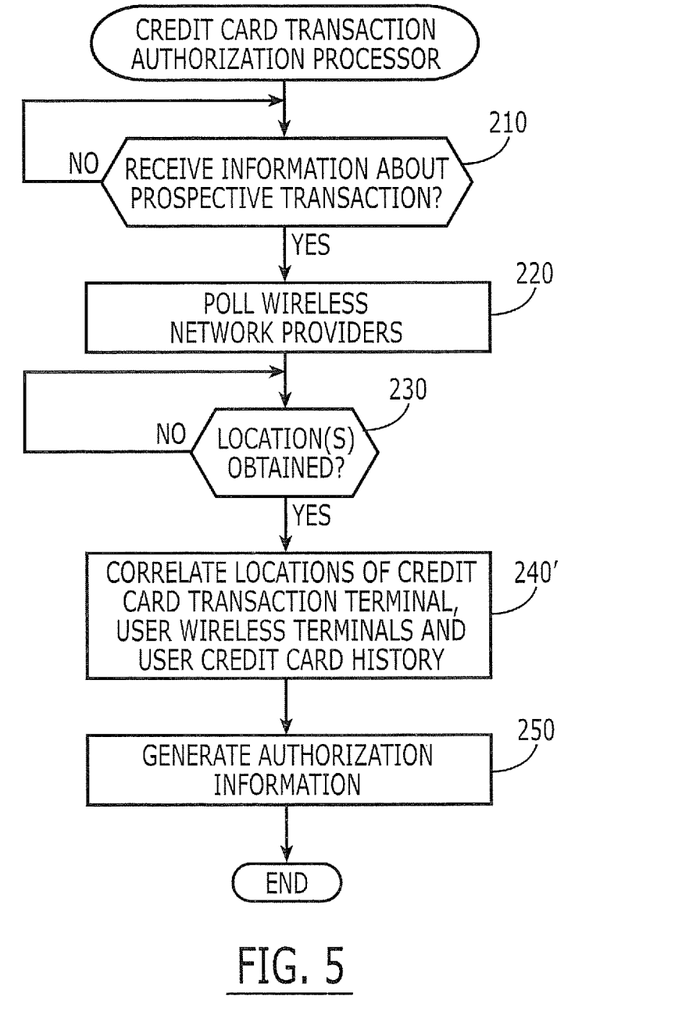

FIG. 5 is a flowchart of operations that may be performed by a credit card transaction authorization processor, such as the credit card transaction authorization processor 116 of FIG. 1, according to other embodiments of the present invention. These embodiments may correspond to embodiments of FIG. 2, except that at Block 240', an additional correlation is made of user credit card history. For example, the history of past credit card transactions for the credit card that took place prior to the prospective credit card transaction may be included in the correlation. Accordingly, credit card profiling that is conventionally used to determine authenticity of a transaction based on past buying habits of a user and/or other concurrent transactions by the user may be correlated with the location of the credit card transaction terminal and the location(s) of the user wireless terminal(s) in generating the authorization information at Block 250.

Figure 6:
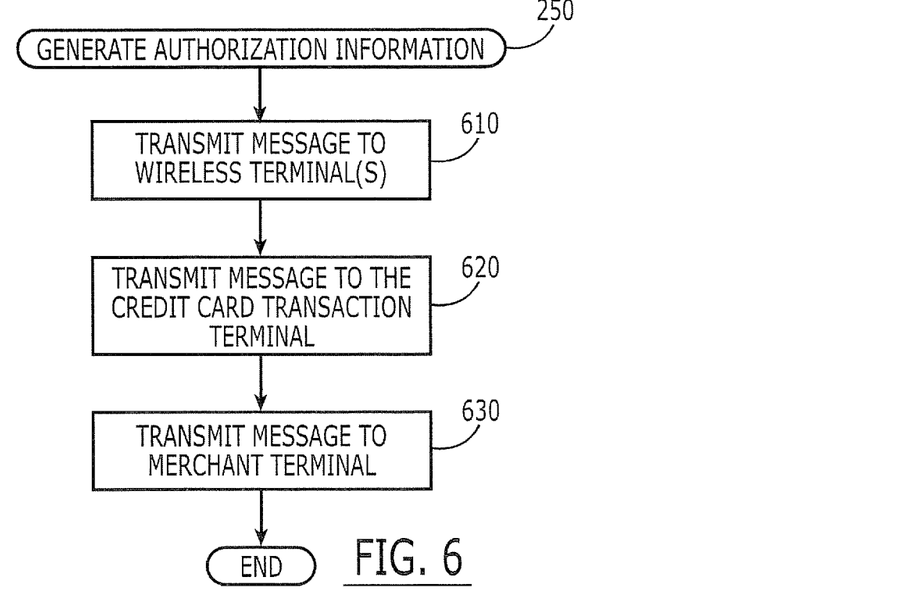

FIG. 6 is a flowchart of operations that may be performed to generate authorization information according to various embodiments of the present invention, which may correspond to Block 250 of FIGS. 2 and 5. Referring to FIG. 6, at Block 610, in some embodiments, the authorization information may be generated by transmitting a message to the at least one wireless terminal 150 that is associated with the user 160 of the credit card 162 for the prospective credit card transaction. The message may state, for example, "Please provide the clerk with the following authorization code XXX", and the authorization code may also be simultaneously transmitted to the credit card transaction terminal 130 and/or another merchant terminal. If desired, the authorization code message transmitted to the wireless terminal 150 may be protected by a password or PIN known only to the legitimate user, such that the user must input their PIN to view the authorization code. Alternatively, or in addition, at Block 620, a message may be transmitted to the credit card transaction terminal 130 itself. This message may indicate, for example, "Please verify additional identification from the credit card holder". Alternatively, the transmission to the credit card transaction terminal 130 may include a picture of the credit card holder and the message, "Please verify that this is the credit card holder". The obtaining of a picture of the credit card holder will be described in greater detail below in connection with FIG. 7.

Finally, at Block 630, in addition, or alternatively, a message may be transmitted to a merchant terminal that is separate from the credit card transaction terminal 130. In particular, the credit card transaction terminal 130 may be visible to the user 160 of the credit card 162, particularly in a checkout line. Accordingly, a message may be sent to a separate merchant terminal, for example, a wireless terminal (e.g., cell phone) of a clerk that is operating the credit card transaction terminal 130, to another merchant terminal in a different location, or even to a merchant security terminal (not shown). This separate message may include a picture of the user and an audible and/or text message that states, "Please verify that this is the credit card holder". Accordingly, embodiments of the present invention may obtain additional authorization information by transmitting a message to the wireless terminal (Block 610), to the credit card transaction terminal (Block 620) and/or to a separate merchant terminal (Block 630).

Figure 7:
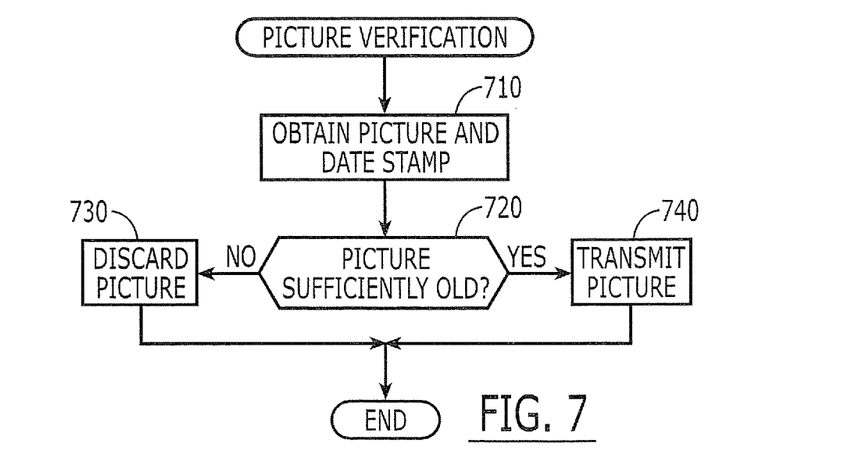

FIG. 7 is a flowchart of operations that may be performed to obtain user authentication using a picture, according to some embodiments of the present invention. These operations may be performed, for example, using the messages that are transmitted at Block 610, 620 and/or 630 and/or at other times.

Referring to FIG. 7, at Block 710, a picture of the user 160 of the credit card 162 is obtained. For example, the credit card issuer 120 may have obtained the picture of the user when the credit card 160 was issued. Alternatively, the wireless network provider 140 may have a picture of the user that in some cases may be stored for use on the wireless terminal 150 home screen, for caller identification, text messaging and/or other applications on the user's wireless terminal 150 and/or for other purposes. The picture may have a date stamp indicating when it was taken. The obtaining of a picture of a user of a credit card or a wireless terminal, along with a date stamp, is well known to those having skill in the art and need not be described further herein.

Still referring to FIG. 7, at Block 720, in order to reduce the likelihood of intentional fraud, a determination is made as to whether the picture is sufficiently old by comparing the date stamp to the current date. In some embodiments, "sufficiently old" may be any day that is prior to the current date. However, in other embodiments, a picture that is, for example, at least several days old, at least a week old or older, may be used. If, at Block 720, the picture is not sufficiently old, then it may be discarded at Block 730. On the other hand, if the picture is sufficiently old at Block 720, it may be transmitted at Block 740, for example as part of any of the operations of Blocks 610, 620 and/or 630 of FIG. 6.

Embodiments of FIG. 7 may arise from recognition that a thief who desires to spoof a credit card authorization system may fraudulently obtain another wireless terminal and store a picture of the user on the fraudulent wireless terminal, and/or may obtain another credit card with a picture of the user, and then use this credit card to misrepresent the user during the proposed credit card transaction. Accordingly, if the picture is new, it may not be used in performing authentication, because it may have been obtained to commit a fraud. On the other hand, if the picture is sufficiently old, it may be used in performing authentication because it is unlikely to have been obtained by a thief. Generally, an older picture is more trustworthy, as long as it is not so old as to be inaccurate for purposes of current identification.

Embodiments of FIG. 7 have been described in connection with location based authorization system, methods and/ computer program products. However, other embodiments of the present invention may use picture verification of FIG. 7 independent of location based authentication. Thus, some embodiments of the present invention may obtain a picture of a user 160 of a credit card transaction terminal 130 for a prospective credit card transaction from a wireless network provider 140 and/or credit card issuer 120 that is associated with the user, along with a date stamp for the picture, as was shown in Block 710. The picture may be selectively transmitted to a location near the credit card transaction terminal 130, including transmitted to the credit card transaction terminal 130 itself, to allow an identity of the user to be verified, if the date stamp is sufficiently before the prospective credit card transaction, as was illustrated in Block 720. Accordingly, picture verification may be used only when there is a high likelihood that the picture itself is legitimate.

Figure 8:
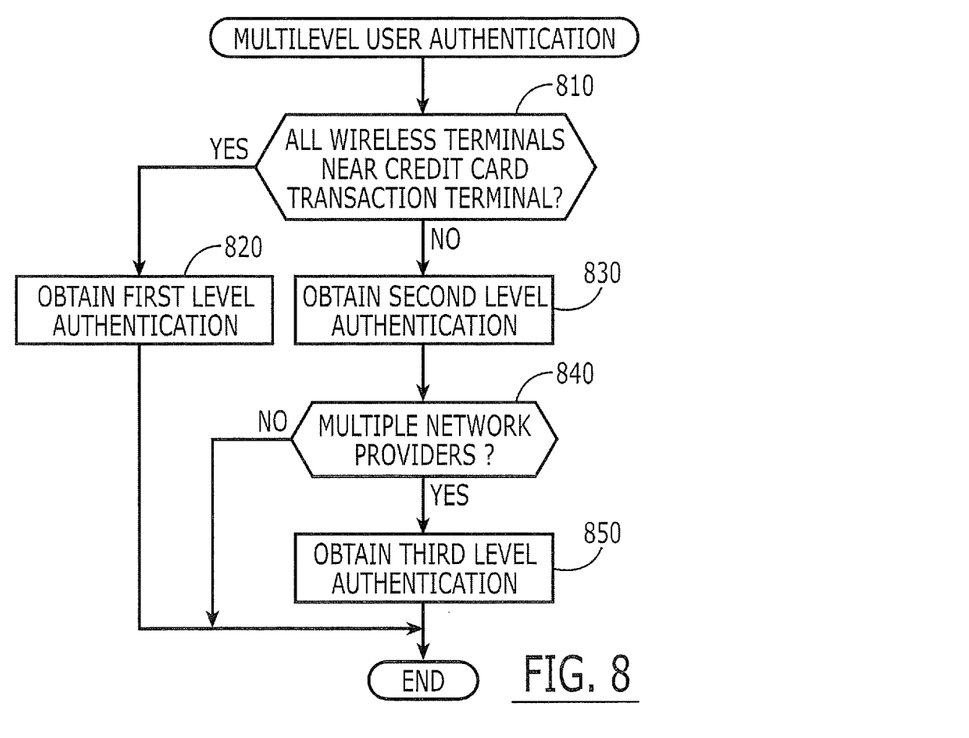

FIG. 8 is a flowchart of operations that may be performed to obtain multiple levels of user authentication according to various embodiments of the present invention. These embodiments may be used in connection with location based credit card authorization according to various embodiments of the present invention. Referring to FIG. 8, at Block 810, a determination is made as to whether all wireless terminals 150 that are registered to a user 160 of the credit card 162 for the prospective credit card transaction are sufficiently close to the credit card transaction terminal 130 for the prospective credit card transaction. If so, a first level of authentication may be obtained at Block 820. The first level of authentication may be a signature that is captured at the credit card transaction terminal 130 and is compared with the signature on the back of the credit card 162. On the other hand, if all of the wireless terminals 150 are not near the credit card transaction terminal 130 at Block 810, a second level of authentication, that is greater than the first level, may be obtained at Block 830. For example, in addition to signature capture, the clerk may be instructed to obtain a second form of identification from the user.

Continuing with the description of FIG. 8, a determination is made at Block 840 as to whether the multiple wireless terminals 150 are also associated with multiple wireless network providers 140. If so, then at Block 850, a third level of authentication, that is greater than the second level of authentication, may be obtained. For example, the third level of user authentication at Block 850 may comprise transmitting a picture of the user 160 that was obtained sufficiently before the prospective credit card transaction to a location near the credit card transaction terminal 130 and verifying an identity of the user 160 from the picture that was transmitted, as was described above in connection with embodiments of FIG. 7. In other embodiments, transmitting a picture of the user and verifying an identity of the user from the picture that was transmitted may be performed as part of a second level of user authentication, and an even stricter level of authentication may be provided at the third level. Accordingly, multiple levels of authentication may be obtained based on the correlation of the location of the credit card transaction terminal and the user wireless terminal(s), according to some embodiments of the present invention. It will be understood that various types of user authentication may be obtained at the first, second and third levels using authentication techniques well known to those having skill in the art.

Additional discussion of various embodiments of the present invention will now be provided. In particular, some embodiments of the invention may arise from recognition that it may be desirable to provide a central credit card transaction server that is capable of communicating with multiple credit issuers, multiple merchants and multiple wireless network providers, to provide a location based credit card transaction authorization clearinghouse. However, other embodiments of the present invention may allow a given wireless network provider to provide location information for wireless terminals in its own system to a plurality of credit card issuers and/or merchants. Moreover, in other embodiments, the credit card transaction server may be operated by a given wireless network provider and the credit card transaction server may be configured to identify wireless phones of other wireless network providers that are registered to the user of a prospective credit card transaction. There may be privacy issues and/or regulatory issues that may impact the solicitation or transmission of customer identification information, but these issues may be overcome using appropriate encryption and/or user pseudonyms. For example, in some embodiments, a pseudonym may be used to hash the personal information of a user of another wireless network provider.

Moreover, any of the embodiments that were described above may be conditioned on the cost of the item being purchased by the credit card transaction, by a metric of prior or concurrent credit card transactions and/or some other indications of a large potential fraud. In other embodiments, however, these factors may need not be considered, because it may be regarded as important to detect any fraud, big or small.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A system, comprising:
a processor; and
a computer-readable memory comprising computer-program instructions that, when executed by the processor, cause the processor to perform operations comprising:
receiving credit-card-transaction information concerning a prospective credit-card transaction
determining whether a purchaser initiating the prospective credit-card transaction is identified in available data as being a user for only a single mobile communication device or for multiple mobile communication devices;
determining, in response to determining that the purchaser is identified as being the user of only the single mobile communication device, whether the single mobile communication device is within a pre-determined proximity of a credit-card-transaction terminal;
determining, in response to determining that the purchaser is identified as being the user of multiple mobile communication devices, whether each one of the multiple mobile communication devices is within the pre-determined proximity of the credit-card-transaction terminal;
initiating, in response to determining that the single mobile communication device is not within the pre-determined proximity of the credit-card-transaction terminal, a first authentication process;
initiating, in response to determining that the multiple mobile communication devices are not each within the pre-determined proximity of the credit-card-transaction terminal, a second authentication process; and
generating authorization information for the prospective credit-card transaction in response to any of (a) determining that the single mobile communication device is within a pre-determined proximity of the credit-card-transaction terminal, (b) determining that each one of the multiple mobile communication devices is within the pre-determined proximity of the credit-card-transaction terminal, (c) a positive result from the first authentication process, and (d) a positive result from the second authentication process.

2. A computer-program product comprising a computer-readable storage medium having computer-executable program code that, when executed by a processor, cause the processor to perform operations comprising:
receiving credit-card-transaction information concerning a prospective credit-card transaction
determining whether a purchaser initiating the prospective credit-card transaction is identified in available data as being a user for only a single mobile communication device or for multiple mobile communication devices;
determining, in response to determining that the purchaser is identified as being the user of only the single mobile communication device, whether the single mobile communication device is within a pre-determined proximity of a credit-card-transaction terminal;
determining, in response to determining that the purchaser is identified as being the user of multiple mobile communication devices, whether each one of the multiple mobile communication devices is within the pre-determined proximity of the credit-card-transaction terminal;

initiating, in response to determining that the single mobile communication device is not within the pre-determined proximity of the credit-card-transaction terminal, a first authentication process;

initiating, in response to determining that the multiple mobile communication devices are not all within the pre-determined proximity of the credit-card-transaction terminal, a second authentication process; and generating authorization information for the prospective credit-card transaction in response to any of (a) determining that the single mobile communication device is within a pre-determined proximity of the credit-card-transaction terminal, (b) determining that each one of the multiple mobile communication devices is within the pre-determined proximity of the credit-card-transaction terminal, (c) a positive result from the first authentication process, and (d) a positive result from the second authentication process.

3. The system of claim 1, wherein the operations further comprise determining, in response to determining that each of the multiple mobile communication devices is not within the pre-determined proximity of the credit-card transaction terminal, whether the multiple mobile communication devices are serviced respectively by a single wireless-network service provider or by multiple wireless-network service providers.

4. The system of claim 3, wherein:
the operations further comprise:
initiating, in response to determining that the multiple mobile communication devices are each serviced by a single wireless-network-service provider, the second authentication process;
initiating, in response to determining that the multiple mobile communication devices are serviced by multiple wireless-network-service providers, a third authentication process; and
the generating operation is initiated in response to any of (a) determining that the single mobile communication device is within a pre-determined proximity of a credit-card-transaction terminal, (b) determining that each one of the multiple mobile communication devices is within the pre-determined proximity of the credit-card-transaction terminal, (c) a positive result of the first authentication process, (d) a positive result from the second authentication process, and (e) a positive result from the third authentication process.

5. The system of claim 4, wherein the third authentication process is more stringent than the second authentication process.

6. The system of claim 4, wherein determining whether the multiple mobile communication devices are serviced by a single wireless-network-service provider, is performed in response to determining that each of the multiple mobile communication devices is not within the pre-determined proximity of the credit-card transaction terminal and in response to a positive result from the third authentication process.

7. The system of claim 6, wherein:
the operations further comprise initiating, in response to determining that the multiple mobile communication devices are not each serviced by the single wireless-network-service provider, a fourth authentication process; and
the generating operation is initiated in response to any of (a) determining that the single mobile communication device is within a pre-determined proximity of a credit-card-transaction terminal, (b) determining that each one of the multiple mobile communication devices is within the pre-determined proximity of the credit-card-transaction terminal, (c) a positive result of the first authentication process, (d) a positive result from the second authentication process, and (e) a positive result from both of the third authentication process and the fourth authentication process.

8. The system of claim 7, wherein the third authentication process is more stringent than the second authentication process.

9. The system of claim 7, wherein the fourth authentication process is more stringent than the third authentication process.

10. The system of claim 7, wherein the second authentication process is more stringent than the first authentication process.

11. The system of claim 1, wherein the operation of determining whether the single mobile communication device is within a pre-determined proximity of a credit-card-transaction terminal is performed using a short-range-proximity-determination process.

12. The system of claim 1, wherein the operation of determining whether each one of the multiple mobile communication devices is within the pre-determined proximity of the credit-card-transaction terminal is performed using a short-range-proximity-determination process.

13. The system of claim 1, wherein at least one of the authentications is performed using a photo of the user.

14. The system of claim 13, wherein:
the photo is stored on at least one user mobile communication device;
the at least one authentication includes determining whether the photo has an age that is older than a threshold age.

15. The system of claim 1, wherein the pre-determined proximity is determined based on at least one variable of a group consisting of a time of day of the prospective credit-card transaction, a current promotion, and a cost of a product sought to be purchased by the prospective credit-card transaction.

16. The system of claim 1, wherein a strictness of at least one of the authentications is established based on at least one variable of a group consisting of a time of day of the prospective credit-card transaction, a current promotion, and a cost of a product sought to be purchased by the prospective credit-card transaction.

17. The computer-program product of claim 2 wherein the operations further comprise determining, in response to determining that each of the multiple mobile communication devices is not within the pre-determined proximity of the credit-card transaction terminal, whether the multiple mobile communication devices are serviced respectively by a single wireless-network-service provider or by multiple wireless-network-service providers.

18. A method, comprising:
receiving, by a system comprising a processor, credit-card-transaction information concerning a prospective credit-card transaction;
determining, by the system, whether a purchaser initiating the prospective credit-card transaction is identified in available data as being a user for only a single mobile communication device or for multiple mobile communication devices;
determining, by the system, in response to determining that the purchaser is identified as being the user of only the single mobile communication device, whether the single mobile communication device is within a pre-determined proximity of a credit-card-transaction terminal;

determining, by the system, in response to determining that the purchaser is identified as being the user of multiple mobile communication devices, whether each one of the multiple mobile communication devices is within the pre-determined proximity of the credit-card-transaction terminal;

initiating, by the system, in response to determining that the single mobile communication device is not within the pre-determined proximity of the credit-card-transaction terminal, a first authentication process;

initiating, by the system, in response to determining that the multiple mobile communication devices are not each within the pre-determined proximity of the credit-card-transaction terminal, a second authentication process; and generating, by the system, authorization information for the prospective credit-card transaction in response to any of (a) determining that the single mobile communication device is within a pre-determined proximity of the credit-card-transaction terminal, (b) determining that each one of the multiple mobile communication devices is within the pre-determined proximity of the credit-card-transaction terminal, (c) a positive result from the first authentication process, and (d) a positive result from the second authentication process.

19. The method of claim 18, wherein the operations further comprise determining, in response to determining that each of the multiple mobile communication devices is not within the pre-determined proximity of the credit-card transaction terminal, whether the multiple mobile communication devices are serviced respectively by a single wireless-network-service provider or by multiple wireless-network-service providers.

20. The method of claim 19, wherein:

the operations further comprise:

initiating, in response to determining that the multiple mobile communication devices are each serviced by a single wireless-network-service provider, the second authentication process;

initiating, in response to determining that the multiple mobile communication devices are serviced by multiple wireless-network-service providers, a third authentication process; and the generating operation is initiated in response to any of (a) determining that the single mobile communication device is within a pre-determined proximity of a credit-card-transaction terminal, (b) determining that each one of the multiple mobile communication devices is within the pre-determined proximity of the credit-card-transaction terminal, (c) a positive result of the first authentication process, (d) a positive result from the second authentication process, and (e) a positive result from the third authentication process.

* * * * *